United States Patent [19]
Kurbitz et al.

[11] Patent Number: 5,144,356
[45] Date of Patent: Sep. 1, 1992

[54] TEMPERATURE COMPENSATED INFRARED OPTICAL IMAGING SYSTEM

[75] Inventors: Gunther Kurbitz, Konigsbronn-Zang; Dieter Marx, Aalen-Waldhausen; Harald Heinrich, Aalen, all of Fed. Rep. of Germany

[73] Assignee: Carl-Zeiss-Stiftung, Heidenheim/Brenz, Fed. Rep. of Germany

[21] Appl. No.: 561,958

[22] Filed: Aug. 2, 1990

[30] Foreign Application Priority Data

Aug. 5, 1989 [DE] Fed. Rep. of Germany ....... 3925964

[51] Int. Cl.$^5$ .......................... G03B 3/00; G03B 13/18
[52] U.S. Cl. ..................................... 354/402; 359/356; 250/238; 356/51
[58] Field of Search ............... 354/400, 402, 403, 430; 350/1.1, 1.2, 1.3, 1.4; 250/238, 495.1; 356/51; 358/227; 359/350, 351, 352, 355, 356, 357

[56] References Cited

U.S. PATENT DOCUMENTS

| | | | |
|---|---|---|---|
| 3,421,009 | 1/1969 | Caruthers | 250/238 |
| 4,148,548 | 4/1979 | Thompson | 350/1.3 |
| 4,533,241 | 8/1985 | Masunaga et al. | 354/403 |
| 4,746,948 | 5/1988 | Matsui | 354/408 |
| 4,828,383 | 5/1989 | Kunishige et al. | 354/403 |

FOREIGN PATENT DOCUMENTS 0264360 4/1988 European Pat. Off. .
3122027 12/1982 Fed. Rep. of Germany .
60-107611 6/1985 Japan .

OTHER PUBLICATIONS

"Modern Photography", Jan. 1983, Advertisement for lens barrel, p. 173.

Primary Examiner—W. B. Perkey
Assistant Examiner—Cassandra C. Spyrou
Attorney, Agent, or Firm—Eugene Stephens & Associates

[57] ABSTRACT

In order to eliminate the influence of temperature on the focus of an IR optical imaging system, radiation from an auxiliary heat source is deflected through the IR optical imaging system such that said radiation impinges on an autocollimating reflector from where it is reflected back into said IR optical imaging system and then impinges on detector elements which are arranged in a detector image plane. Electrical signals generated by the affected detectors are analyzed, digitized, and then compared in a computer whose output signals control a motor for adjusting the axial position of at least one of the optical lens elements of the IR system such that the autocollimating condition between the auxiliary heat source and its image in the detector plane is maintained at all times.

8 Claims, 1 Drawing Sheet

ND OPTICAL IMAGING SYSTEM

TEMPERATURE COMPENSATED INFRARED OPTICAL IMAGING SYSTEM

TECHNICAL FIELD

This invention relates to infrared ("IR") optical imaging systems and, more particularly, to a method and apparatus for eliminating the effect of temperature on the focus of IR optical imaging systems.

BACKGROUND

IR optical imaging systems are well-known, comprising camera-like elements in which incident IR radiation is focused on a detector or a plurality of detectors which generate electrical signals varying in accordance with the intensity of the radiation focused upon the detector's surfaces. An image of the incident IR is often focused on a two-dimensional array of detector elements in the same manner as radiation in the visible spectrum is focused on the plate or film plane of a conventional camera. However, since the output of the IR detectors is an electrical signal, some systems use only a single line of detector elements in combination with scanning mirror arrangements, and the image of the incident radiation is broken up into a series of linear components which are sequentially scanned across this single line of detectors, the output of each scan being stored and thereafter used to recreate the overall IR pattern electronically.

The lens elements of these IR optical imaging systems are manufactured from crystalline semiconductive materials such as Ge, Si, ZnSe, CdTe, GaAs, which have a refractive index with high temperature coefficient. That is, these materials are very sensitive to temperature variations and, as a result of this, the focusing of an IR optical imaging system is to a great extent a function of temperature.

To eliminate the effect of temperature changes on the focal length, i.e., the focus, of an IR optical imaging system, the prior art has suggested encasing the entire IR imaging system in a temperature-controlled housing, or adjusting of the imaging lens elements to predetermined focusing positions which are selected according to ambient temperatures. However, these solutions add significant complexity and expense to the manufacture and use of the lens systems.

The prior art also shows (in U.S. Pat. No. 4,148,548) an IR imaging system in which one or more of the optical lens elements are movable relative to each other and in which relatively complex iterative procedures are suggested for adjusting the position of these movable lenses to achieve optimum focus under various temperature conditions.

Such known temperature compensation systems are all relatively complex and, perhaps more importantly, do not take into account that radial temperature gradients occur in addition to axial ones in the IR optical system. Therefore, these prior art systems provide temperature compensation that is less than satisfactory in many practical applications.

The invention disclosed herein solves the problems referred to above in a relatively simple manner with a method and apparatus, suitable for automation, which compensates for radial as well as axial temperature gradients in the lenses of IR optical systems.

SUMMARY OF THE INVENTION

According to the invention, an auxiliary heat source of predetermined characteristics is mounted in proximity to the IR optical imaging system, and infrared radiation emanating from this known auxiliary heat source is directed through the imaging system and focused on the system's detector.

The image of this known radiation is collimated to simulate radiation received from infinity, and this collimated image is passed through all of the lens elements of the system prior to being focused on the detector. The lens system includes one lens that is movable along the optical axis of the system for adjusting focus. Signals from the detector responsive to the image of the auxiliary heat source are analyzed electronically as the focusing lens is moved back and forth. When these signals indicate that focus is optimum, movement of the focusing lens is stopped. Since the auxiliary heat source image is passed through all of the lens elements, both the axial and radial changes in these lenses affect the image of this auxiliary source. Therefore, when the auxiliary source is optimally focused by adjustment of the movable lens, the IR system is adjusted appropriately to focus all incident radiation which appears effectively to be at infinity. Since the auxiliary heat source is a known constant, changes due to temperature variation, whether they occur equally throughout the optical system, or whether they affect different lens elements of the system differently, are quickly and simply compensated by adjustment of the movable lens to maintain optimum focus of the auxiliary heat source.

DRAWINGS

DETAILED DESCRIPTION

Figure 1:
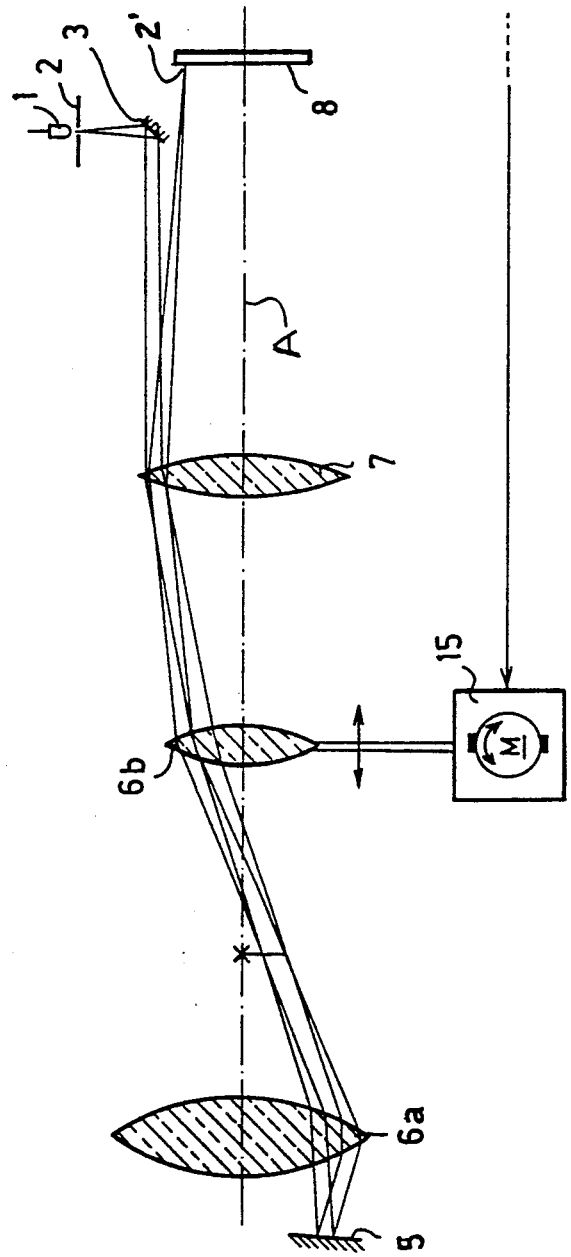
FIG. 1 is a schematic illustration of the lenses and detectors of an IR optical imaging system according to the invention.

FIG. 1 is a schematic representation of the basic lens elements and detectors of an IR optical imaging system aligned along an optical axis A. It will be understood that incident radiation from the scene or object being monitored approaches the illustrated system from the left.

An auxiliary heat source 1 has an optically effective geometry defined by a diaphragm 2 which is positioned to be conjugate relative to a detector plane 8. IR radiation emitted by auxiliary heat source 1, which has a selected wavelength and intensity, is deflected by deflector 3 and transmitted through all of the lenses 7, 6b, and 6a of the IR optical imaging system so that it impinges on autocollimating reflector 5. The latter reflects the radiation so that it reenters the optical IR imaging system as parallel rays, being again transmitted through all of the lenses 6a, 6b, and 7. An image 2' (of the auxiliary radiation passing through diaphragm 2) impinges on at least one of the detector elements arranged in detector image plane 8.

Figure 2:
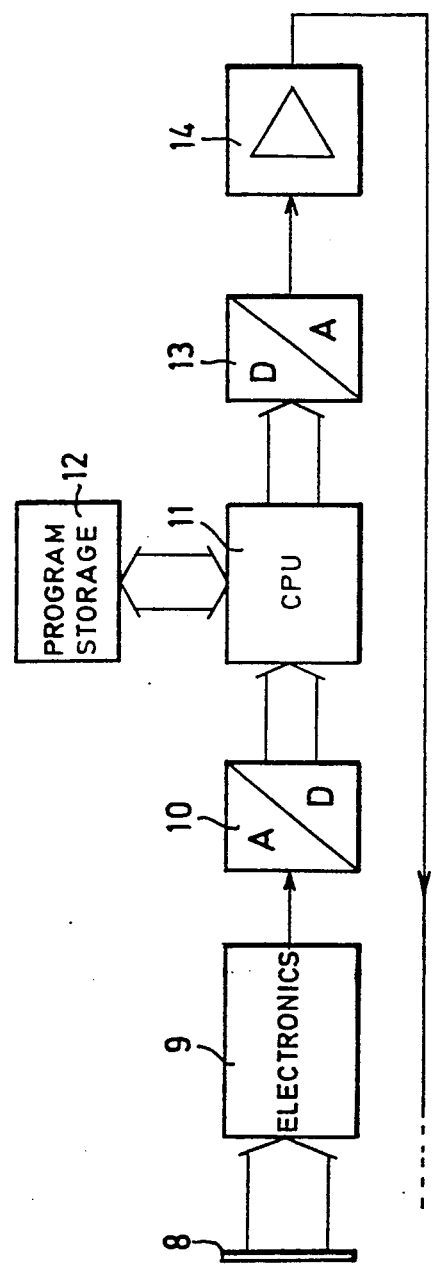
FIG. 2 is a block diagram of the invention's electronic circuitry for processing the signals generated by the system's IR detectors and for controlling the focus of the system.

FIG. 2 shows, in block form, the various computer and other circuit elements normally used for receiving, storing, analyzing, and/or recording the signals generated by the IR detectors positioned on detector plane 8.

These various elements are used to carry out the invention as follows.

The signals received from the detector(s) upon which the image of the auxiliary heat source is focused, are appropriately amplified and filtered by the electronic circuits 9, being segregated from the signals relating to the incident radiation being monitored. Electronic circuits 9 also analyze these signals, e.g., passing them through a peak-reading rectifier in series with a sample hold circuit. Signals representing image 2' of auxiliary heat source 1 (e.g., peak values) are digitized by an A/D converter 10 and then sent to a computer 11 controlled by a program stored in a program memory 12. The sequentially-stored auxiliary heat signals are compared to each other, and differences in these sequential signals are used to generate digitized output signals representative of such changes. These output signals are then converted back to analog by D/A converter 13, amplified by amplifier 14, and delivered as input to a motor 15 which drives apparatus for moving focusing lens 6b along axis A.

Since the intensity of image 2' of auxiliary heat source 1, as received on detector plane 8, varies in accordance with the focus of the imaging system, changes in the intensity of the signals generated by the affected detector(s) can be analyzed by the well-known circuitry described above to move lens element 6b until the signals received by the detector(s) are optimized, thereby maintaining the focus of the IR system even though the dimensions of one or more of the various lens elements may change in response to variations in temperature.

If image 2' impinges on a plurality of detector elements, electronic circuits 9 determine the mean value of the signals and use this mean value for signal analysis. Also, the temperature of auxiliary heat source 1, as well as the geometry of diaphragm 2, are selected so that image 2' includes sufficient radiation to assure generation of an adequate signal-to-noise ratio.

While each lens element's dimensions may be altered radially as well as axially by changes in ambient temperature, the just-described method and apparatus compensate the focus of the IR imaging system appropriately, because the invention's auxiliary radiation is passed through each such altered lens element during the focus adjustment procedure.

We claim:

1. A method for eliminating an effect of temperature variations on an adjustable focus of an infrared optical imaging system for camera-like apparatus having as its primary function imaging of infrared radiation emanating from sources outside said apparatus by directing incident image-forming infrared radiation through said system and focusing said incident radiation on a signal-generating detector, comprising the steps of:
   mounting an auxiliary heat source in proximity to said optical imaging system, said heat source emitting auxiliary infrared-focussing radiation of preselected wavelength and intensity;
   directing said auxiliary infrared-focussing radiation immediately from said auxiliary heat source to said infrared optical imaging system so that it is focused on said detector along with said incident image-forming infrared radiation;
   monitoring and analyzing signals generated by said detector in response to said immediately-directed infrared-focussing radiation from said auxiliary heat source; and
   adjusting the focus of said infrared optical imaging system until said signals generated by said immediately-directed auxiliary infrared-focussing radiation indicate said focus is optimized.

2. The method of claim 1 wherein said directing step further comprises positioning a plane mirror in proximity to said imaging system for receiving and reflecting said auxiliary heat source radiation so that said adjusting step maintains an autocollimating condition between the auxiliary heat source and its image as focused on said detector.

3. The method of claim 1 wherein said monitoring and analyzing step comprises determining a peak value for such signals, comparing such peak values sequentially, and generating a focus-adjusting signal based upon a difference between such sequential peak values.

4. The method of claim 3 wherein said signal-generating detector comprises a plurality of detector elements and said monitoring and analyzing step further comprises determining a mean value of signals from all of the detector elements prior to determining said peak value.

5. Apparatus for an infrared optical imaging system having as its primary function imaging of incident infrared radiation on a signal-generating detector, said apparatus having a movable lens for adjusting the system focus and also having signal-sensing means responsive to signals from said signal-generating detector, the improvement for eliminating an effect of temperature variations on the focus of said system comprising:
   an auxiliary heat source of preselected wavelength and intensity positioned in proximity to said optical system so that radiation therefrom is directed immediately to said infrared optical imaging system and is focused on said detector along with said incident image-forming infrared radiation; and
   electronic means associated with said signal-sensing means for (a) analyzing signals generated by said detector and determining a signal level indicative of optimum focus of said immediately-directed infrared-focussing radiation from said auxiliary heat source and (b) controlling a position of said movable lens to adjust the system focus to maintain said optimum focus signal level.

6. The apparatus of claim 5 further comprising a plane mirror positioned in proximity to said optical imaging system for receiving and reflecting said auxiliary heat source radiation so that the adjustment of said lens by the electronic means maintains an autocollimating condition between said auxiliary heat source and its image as focused on said detector.

7. The apparatus of claim 6 wherein said plane mirror is dimensioned and positioned to minimize vignetting of said incident infrared radiation passing through said optical system.

8. The apparatus of claim 5 further comprising a diaphragm positioned between said auxiliary heat source and said imaging system, and wherein the geometry of said diaphragm and the temperature of said auxiliary heat source are selected so that a signal-to-noise ratio of signals from said signal generating detector assures analysis of said signals by said electronic means.

* * * * *